United States Patent [19]

Bramming, deceased et al.

Best Available Copy

[11] E Re. 30,768

[45] Reissued Oct. 13, 1981

[54] VACUUM INSULATED BOTTLE

[75] Inventors: Carl Bramming, deceased, late of Nashville, Tenn.; by Clara B. Bramming, heir, Plainfield, Ind.; by Kenneth R. Bramming, heir, Nashville, Tenn.; by Beverley B. Wheeler, heir, Plainfield, Ind.

[73] Assignee: Aladdin Industries, Incorporated, Chicago, Ill.

[21] Appl. No.: 742,224

[22] Filed: Nov. 16, 1976

Related U.S. Patent Documents

Reissue of:

[64] Patent No.: 3,910,441
Issued: Oct. 7, 1975
Appl. No.: 446,695
Filed: Feb. 28, 1974

[51] Int. Cl.[3] ..... A47J 41/02

[52] U.S. Cl. ..... 215/13 R

[58] Field of Search ..... 215/13 R, 13 A, 12 A; 220/421, 446, 447

[56] References Cited

U.S. PATENT DOCUMENTS

| | | | |
|---|---|---|---|
| 3,096,897 | 7/1963 | Hansen | 215/13 R |
| 3,193,126 | 7/1965 | Bramming | 215/13 A |
| 3,752,347 | 8/1973 | Bell | 215/13 R |
| 3,813,757 | 6/1974 | Bell | 215/13 R |

FOREIGN PATENT DOCUMENTS

| | | | |
|---|---|---|---|
| 1199819 | 7/1970 | United Kingdom | 215/13 R |

*Primary Examiner*—Donald F. Norton
*Attorney, Agent, or Firm*—McDougall, Hersh & Scott

[57] ABSTRACT

A vacuum insulated bottle utilizing a wide opening vacuum filler is disclosed. A thin walled liner is disposed in the interior of the filler and extends upwardly therefrom to form a narrow mouth opening to the lined interior for providing the pouring and thermal insulating characteristics of a narrow mouth vacuum filler bottle.

14 Claims, 1 Drawing Figure

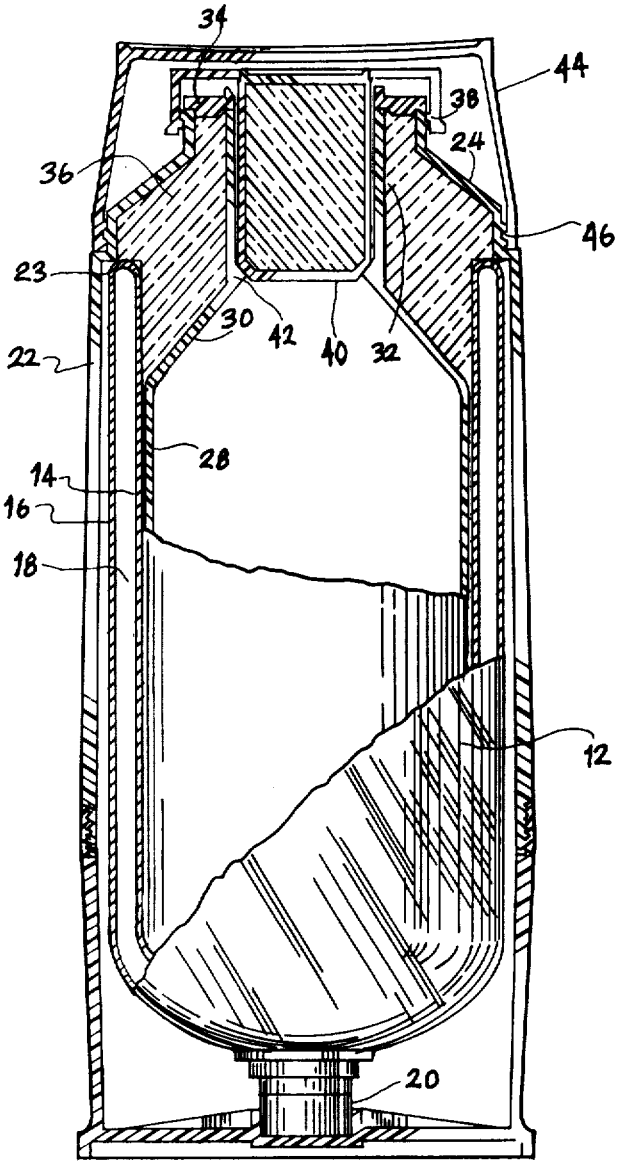
34
44
38
24
36
46
23
30
42
40
32
22
28
14
16
18
12
20

VACUUM INSULATED BOTTLE

Matter enclosed in heavy brackets [ ] appears in the original patent but forms no part of this reissue specification; matter printed in italics indicates the additions made by reissue.

BACKGROUND OF THE INVENTION

The present invention relates to the field of containers for maintaining liquid and solid materials, such as food, at a substantially constant temperature over a relatively long period of time. One highly successful device for accomplishing this objective is a Dewar flask or thermos bottle. Such a container employs a double wall filler which may be made of metal or glass and from which air is substantially evacuated.

It is known in the prior art to provide narrow mouth thermos bottles which are well situated for storing and pouring liquids and which utilize a tall and relatively small diameter vacuum filler. Wide mouth thermos bottles employ a vacuum filler of a larger diameter and have a protective liner which conforms to the internal wall of the filler. Such a thermos, while being well suited to the storing and dispensing of solid and semi-solid foods such as soups, has the disadvantage of a lower thermal insulating capability than the narrow mouth design. Further, liquids are somewhat more difficult to pour without spilling.

It is accordingly an object of the present invention to obtain the thermal insulating capability and pouring characteristics of a narrow mouth thermos while at the same time utilizing a wide mouth filler for the thermos.

It is another object of the present invention to provide a thermos which utilizes a wide mouth vacuum filler but has the pouring characteristics of a narrow mouth thermos.

It is a further object of the present invention to provide a narrow mouth thermos with a liner for preventing mixing of filler particles with food stored therein should the vacuum filler break.

It is another object of the present invention to provide a thin wall liner for converting a wide mouth vacuum filler for narrow mouth pouring.

Other objects and advantages of the present invention will become apparent from the remaining portion of the specification.

SUMMARY OF THE INVENTION

A thermos bottle utilizing a large diameter vacuum filler is disclosed. The filler is surrounded by a protective jacket and supported on a base. A liner disposed within the material receiving portion of the filler extends upwardly from the filler to form a narrow mouth opening to the lined interior. The liner is attached to the jacket near its upper end. A heat insulating material is disposed in a cavity defined by the area between the protective jacket and the liner near the top portion of the vacuum filler.

DESCRIPTION OF THE DRAWING

The FIGURE is a longitudinal section through a thermos according to the invention and having portions broken away.

DETAILED DESCRIPTION

Referring to the FIGURE, the thermos 10 includes a Dewar flask or vacuum filler 12. The filler is preferably formed of glass although steel can be used. The filler is a double wall structure of generally cylindrical construction having an inner wall 14 and an outer wall 16. An airtight chamber 18 is defined by the area between the walls from which air is evacuated through an opening in the bottom of the filler in a manner well known in the art. The walls 14 and 16 may be silvered on the inside to reduce radiant heat loss.

The filler is supported on a base 20 which may be integral with or attached by conventional means to a protective jacket 22. The filler has an opening 23 to its insulating interior. The jacket, which may be of plastic, surrounds the filler 12 to prevent damage thereto. The jacket 22 has a tapered portion 24, *which may be in the form of a separate breast piece,* which tapers inwardly above the filler opening 23 for a reason to be explained.

Disposed in the insulating interior of the filler 12 is a protective liner 28. The liner conforms to the inner wall 14 of the filler and is thin walled to reduce conductive heat loss. It may be formed from any desired material having suitable heat characteristics and which is safe for use with food. Preferred materials include:

| | | |
|---|---|---|
| Polypropylene | ABS | Acetal |
| Polycarbonate | Modified PPO | Nylon |
| Polysulphone | HDPE | Polybutylene Therathalate |

The liner 28 may be formed by blow molding, preferably injection blow molding so that it closely conforms to the glass filler. The liner should not, however, be so snug against the filler that thermal expansion thereof causes excessive stress on the filler or buckling of the liner.

Near the filler opening 23 the liner 28 tapers inwardly and upwardly along a section 30 and then becomes cylindrical in cross section forming a relatively small diameter opening 32 to the lined interior of the thermos. In this manner the liner 28 serves to convert or translate a wide mouth thermos including a wide opening filler 12 into a thermos that has the liquid pouring and thermal insulating characteristics of a narrow mouth thermos. The liner also provides protection against glass particles from a broken filler mixing with the thermos contents.

In order to obtain optimum thermal insulation the fill level of the thermos should be at or below the filler opening 23 as illustrated in the FIGURE. This can be accomplished by utilizing a stopper which extends into the lined interior to a position at or below the filler opening 23.

The liner 28 and the protective jacket 22 are attached to each other at their upper ends for the purpose of preventing moisture, dirt or the contents of the thermos from entering the cavity between the jacket and liner during cleaning or pouring. They may be attached by heat welding, adhesive bonding or a mechanical lock. The FIGURE illustrates a heat weld portion 34 joining the jacket *or breast piece portion thereof* to the liner.

A key element of the present invention is the provision of a thermal insulating collar 36 in the sealed cavity between the jacket and liner near the filler opening 23. This insulating collar is preferably a foam collar which can be premolded as a one-piece ring or as a split ring. The insulating collar 36 conforms to the shape of the sealed cavity and serves to support and add rigidity to the tapered section 30 of the liner 28. Further, the collar provides thermal insulation in the tapered region which is not insulated by the filler 12.

Any heat insulating material which can be formed to the required shape can be used in the cavity such as a rigid insulating type of urethane foam. Preferred materials for the collar are carbon dioxide expanded urethane foam, fluorocarbon expanded urethane foam, and polystyrene foam.

The top of jacket 22 has external threads 38 thereon for engaging a threaded stopper 40 in the narrow mouth opening 32. The stopper seats on a rim 42 to seal the lined interior of the thermos for storage. A combination protective cap and drinking cup 44 is secured onto the jacket 22 by threads 46.

As an indication only, of the improved thermal insulating characteristics which may be obtained with the present invention, it has been found that the temperature loss in a quart size thermos over a four-hour period with water initially at 205°–210° F. was:

11° F. in a narrow mouth standard thermos,

22° F. in a wide mouth standard thermos, and

14° F. in a thermos having a wide mouth filler with the narrow mouth conversion liner of the present invention and filled to the top of the filler.

While I have shown and described embodiments of this invention in some detail, it will be understood that this description and illustrations are offered merely by way of example, and that the invention is to be limited in scope only by the appended claims.

I claim:

1. A vacuum insulated bottle comprising:

a vacuum filler having a heat insulating interior for receiving material therein and having a relatively wide opening to said interior;

a protective jacket disposed about said filler;

a liner adjacent to *and* closely conforming to *and* disposed in the temperature insulating interior of said filler and extending upwardly therefrom to form a relatively narrow mouth opening to the lined interior, said liner being attached to the jacket at the liner's upper end; and a collar formed of heat insulating material disposed in a cavity formed between the jacket and the liner near said wide opening.

2. The vacuum insulated bottle of claim 1 further including:

a stopper adapted to close said narrow mouth opening; and a cap engageable on said jacket for covering the stopper and narrow mouth opening.

3. The vacuum insulated bottle of claim 2 wherein said stopper extends into said interior to a position at or below the top of said liner thereby to define a fill level for said bottle which is at or below the top of said liner for optimizing the thermal insulating capability of the bottle.

4. The vacuum insulated bottle of claim 1 wherein the heat insulating material is a rigid foam adapted to support said liner near the top of the filler.

5. The vacuum insulated bottle of claim 1 wherein heat insulating material is selected from the group comprising:

fluorocarbon expanded urethane foam, carbon dioxide expanded urethane foam, and polystyrene foam.

6. The vacuum insulated bottle of claim 1 wherein said liner is thin walled to reduce conductive heat loss.

7. The vacuum insulated bottle of claim 1 wherein said liner is selected from the group of materials comprising:

polypropylene, ABS, acetal, polycarbonate, modified PPO, nylon, polysulphone, HDPE and polybutylene therathalate.

8. The vacuum insulated bottle of claim 1 wherein the liner is produced by blow molding.

9. The vacuum insulated bottle of claim 1 wherein the liner is heat welded to the jacket to prevent leakage into said cavity.

10. A thin walled liner providing a narrow mouth opening to a vacuum insulated bottle having a relatively wide opening vacuum filler, said liner adjacent to and closely conforming to the interior of said filler and extending upwardly and inwardly therefrom to form said narrow mouth opening.

11. The vacuum insulated bottle of claim 9 wherein said liner is selected from the group of materials comprising:

polypropylene, ABS, acetal, polycarbonate, modified PPO, nylon, polysulphone, HDPE and polybutylene therathalate.

*12. An insulated bottle for containing foodstuffs or the like comprising an outer case, a liner received within said outer case and spaced therefrom for a major portion of the depth of said liner, said liner having an outer configuration of substantially cylindrical shape and terminating at one end thereof in a constricted neck and defining a cavity adapted to receive foodstuffs or the like, a vacuum filler having a generally cylindrical configuration and an opening at one end thereof interposed between said outer case and the cylindrical portion of said liner, the upper end of said vacuum filler terminating contiguous to the juncture between said liner cylindrical portion and its neck, a body of insulating material received between a portion of said outer case and said neck, said body of insulating material having a configuration conforming generally in shape to said neck and terminating contiguous to the juncture of said neck and said liner cylindrical portion, said body of insulating material being formed with a recess therein for receiving and supporting the upper end of said vacuum filler.*

*13. An insulated bottle as set forth in claim 12 wherein the outer case comprises a generally cylindrical portion and a separate breast piece to which the upper end of the liner is affixed.*

*14. An insulated bottle as set forth in claim 12 wherein the body of insulating material comprises a foamed plastic formed from two pieces.*

* * * * *